(12) United States Patent
Cunningham

(10) Patent No.: US 11,260,569 B2
(45) Date of Patent: Mar. 1, 2022

(54) MODULAR INJECTION MOLDING BARREL AND SCREW ASSEMBLIES

(71) Applicant: Charles Stephen Cunningham, Elmhurst, IL (US)

(72) Inventor: Charles Stephen Cunningham, Elmhurst, IL (US)

( * ) Notice: Subject to any disclaimer, the term of this patent is extended or adjusted under 35 U.S.C. 154(b) by 6 days.

(21) Appl. No.: 16/758,924

(22) PCT Filed: Jan. 31, 2020

(86) PCT No.: PCT/US2020/016187
§ 371 (c)(1),
(2) Date: Apr. 24, 2020

(87) PCT Pub. No.: WO2021/154291
PCT Pub. Date: Aug. 5, 2021

(65) Prior Publication Data
US 2021/0252760 A1    Aug. 19, 2021

(51) Int. Cl.
*B29C 45/17*    (2006.01)
*B29C 45/62*    (2006.01)
(Continued)

(52) U.S. Cl.
CPC .............. *B29C 45/62* (2013.01); *B29C 45/10* (2013.01); *B29C 45/13* (2013.01); *B29C 45/176* (2013.01);
(Continued)

(58) Field of Classification Search
None
See application file for complete search history.

(56) References Cited

U.S. PATENT DOCUMENTS 3,319,299 A * 5/1967 Kiraly .................... B29C 45/52
366/77
4,846,652 A * 7/1989 Hehl ................... B29C 45/1775
425/190
(Continued)

OTHER PUBLICATIONS

Rosato, Injection Molding Handbook, 2000, Springer Science, vol. 1 ed 3 (Year: 2000).*

(Continued)

*Primary Examiner* — Armand Melendez
(74) *Attorney, Agent, or Firm* — Cook Alex Ltd.

(57) ABSTRACT

A modular barrel and screw assembly for use in injection molding including a barrel having a barrel body, a separate barrel injection portion and a separate barrel end cap, with the barrel end cap being removably connected to the barrel injection portion and the barrel injection portion being removably connected to the barrel body, and a screw assembly having a screw tip assembly removably connected to a screw portion, wherein an injection chamber having a shot volume is defined by the barrel injection portion, the barrel end cap and the screw tip assembly. The modular barrel and screw assembly enables servicing of the barrel injection portion, barrel end cap and/or screw tip assembly without requiring removal of the barrel body, and enables use of a plurality of alternative corresponding separate barrel injection portions, separate barrel end caps and tip assemblies that provide a plurality of different shot volumes.

17 Claims, 7 Drawing Sheets

(51) Int. Cl.
  *B29C 45/60* (2006.01)
  *B29C 45/50* (2006.01)
  *B29C 45/13* (2006.01)
  *B29C 45/27* (2006.01)
  *B29C 45/22* (2006.01)
  *B29C 45/10* (2006.01)

(52) U.S. Cl.
  CPC ...... *B29C 45/1756* (2013.01); *B29C 45/1775* (2013.01); *B29C 45/22* (2013.01); *B29C 45/27* (2013.01); *B29C 45/278* (2013.01); *B29C 45/2727* (2013.01); *B29C 45/50* (2013.01); *B29C 45/60* (2013.01)

(56) References Cited

U.S. PATENT DOCUMENTS

| | | | |
|---|---|---|---|
| 5,261,807 A * | 11/1993 | Hehl | B29C 45/20 425/192 R |
| 10,427,341 B2 | 10/2019 | Altonen et al. | |
| 2002/0160071 A1 | 10/2002 | Kestle et al. | |
| 2007/0267779 A1 | 11/2007 | Manda | |
| 2008/0095876 A1* | 4/2008 | Diaconu | B22D 17/2023 425/182 |
| 2012/0139147 A1* | 6/2012 | Houk | B29B 7/845 264/102 |
| 2016/0075065 A1 | 3/2016 | Yokoyama | |

OTHER PUBLICATIONS

"Threaded Pipe Flanges", Coastal (Year: 2016).*
International Search Report and Written Opinion dated Apr. 14, 2020 for PCT/US20/16187.

* cited by examiner

MODULAR INJECTION MOLDING BARREL AND SCREW ASSEMBLIES

CROSS-REFERENCE TO RELATED APPLICATION

This application claims the benefit of priority of International Patent Application PCT/US20/16187, filed Jan. 31, 2020, the disclosure of which is hereby incorporated by reference in its entirety.

FIELD OF THE INVENTION

The present disclosure relates generally to injection molding equipment. More specifically, this application relates to barrel and screw assemblies used with injection molding equipment, for moving material to and injecting material into injection molds.

BACKGROUND

The injection molding industry utilizes specialized equipment to heat solid granular or pelletized material until it is in liquid form, and to inject the liquid into a mold. The material may be any one of several thermoplastics, thermo-setting polymers or the like. It is common to have the solid material be fed from a hopper into an elongated heated barrel having a cylindrical inner surface, a fixed length and a barrel end cap connected to a front end of the barrel. The barrel may be heated, for example, by heat wraps or heating elements wrapped around the barrel along its length. The barrel end cap includes a nozzle or passage that may be connected to and in communication with a cavity in an injection mold. The nozzle permits fluid to be forced through the barrel end cap and injected under pressure into the mold cavity.

A rotating and reciprocating elongated screw assembly extends through a rear end of the barrel and toward the barrel end cap that is connected to the front end of the elongated barrel. A standard screw assembly includes a splined drive shank at a rear end, an elongated screw portion and a tip assembly removably connected to the front end of the elongated screw portion. The drive shank commonly is rotated by a drive motor and reciprocated by an injection cylinder, so as to force the screw assembly forward within the barrel. The tip assembly typically includes a generally conical-shaped tip portion and structure that acts as a valve, such as a check valve or one-way valve. The internal configuration of the barrel end cap receives and corresponds to the conical-shaped tip portion.

It is common for the hopper to be located generally near the rear of the barrel. The screw typically includes flights which act as an auger when the screw is rotated. As the screw rotates, the solid material is forced forward within the heated barrel. While the material moves forward along the length of the barrel, the heat melts the material until it becomes a liquid. The flights on the rotating screw continue to force the liquid forward and it passes the tip assembly connected to the front end of the screw. The one-way check valve structure of the tip assembly permits the fluid to pass by the tip assembly and to fill an injection chamber located forward of the tip assembly. The injection chamber is defined by an area bounded by the barrel end cap, the cylindrical inner surface of the barrel and the closed check valve of the tip assembly, when the screw assembly is in a rearward position. The injection chamber defines a volume of material that will be injected into the mold when the shank of the screw is forced from a rearward position to a forwardmost position by the injection cylinder.

As the injection chamber is filled, the tip assembly and screw move rearward until the injection chamber is full. The volume of material that fills the injection chamber is commonly referred to as a "shot." Once the injection chamber is full, the trapped fluid or shot forces the valve structure of the tip assembly to close and the shot is ready to be injected through the nozzle in the barrel end cap and into the mold. The tip assembly then acts as a plunger as the screw assembly is forced forward and the fluid in the injection chamber is forced through the nozzle in the barrel end cap and into the mold. The volume of the shot may vary by changing the length of the longitudinal movement or stroke of the screw assembly. Thus, a typical injection molding barrel and screw assembly will have a set maximum shot volume, but may be used for injecting shots of lesser volume by limiting the stroke of the screw assembly because when the screw is forced forward, the valve closes and the tip assembly acts as a plunger. The shot volume chosen for a given injection molding operation depends at least on the volume of the mold cavity and passage between the injection chamber and the mold cavity.

Barrel and screw assemblies may be very large, high mass components, which in turn can require complex and very expensive machining and manufacturing. It also may be difficult and time consuming with respect to handling and changing out an entire barrel and screw assembly each time there is a desire to utilize molds having a greater mold cavity volume than the maximum shot volume of a presently installed barrel and screw assembly, or to change back to a barrel and screw assembly having a smaller shot volume. Additionally, a tip assembly may need servicing or maintenance but normally is located well within the barrel when connected to the front of the screw portion, and therefore, the tip assembly is not accessible without fairly significant, inconvenient and time-consuming disassembly and reassembly of the barrel and screw assembly.

SUMMARY

In one aspect, the present disclosure provides a modular barrel and screw assembly for use in injection molding including a barrel having a barrel body, a separate barrel injection portion and a separate barrel end cap, with the barrel end cap being removably connected to the barrel injection portion and the barrel injection portion being removably connected to the barrel body, and a screw assembly having a screw portion and a screw tip assembly removably connected to the screw portion, wherein an injection chamber having a shot volume is defined by the barrel injection portion, the barrel end cap and the screw tip assembly.

In a second aspect, the disclosure provides that the modular barrel and screw assembly include the barrel body having a passage that extends from a rear end to a front end, with a front end of the passage having an inner diameter. The screw portion extends within the passage of the barrel body and rearward from the rear end of the barrel body. The barrel injection portion has a passage that extends from a rear end to a front end, with the passage having a minimum inner diameter of sufficient size to receive a front end of the screw portion, and the rear end of the barrel injection portion being removably connected to the front end of the barrel body. The barrel end cap has a passage extending from a rear end to a front end, with the passage including a forward extending nozzle portion and the passage having a rearward facing recess between the rear end and the nozzle portion. The screw tip assembly is sized to be received within the passage of the barrel injection portion and has a front end sized and shaped to be received by the rearward facing recess in the barrel end cap when removably connected to a front end of the screw portion and in a forwardmost position. The screw tip assembly may be of various shapes, such as conical, conical with a fluted sidewall, generally conical but truncated, hemispherical, blunt or other suitable shapes. In turn, the rearward facing recess in the barrel end cap will have a shape corresponding to the tip assembly.

The barrel and screw assembly is modular in that a barrel body and screw portion are connected to an injection molding machine drive assembly and hopper, and may be used with a plurality of alternative corresponding separate barrel injection portions, separate barrel end caps and tip assemblies that provide a plurality of different shot volumes. Thus, the barrel body is of shorter length than a standard barrel and it is to be combined with a barrel injection portion to provide the full length of barrel needed with a screw assembly. In addition, different barrel injection portions may be used with corresponding different barrel end caps and tip assemblies to provide different shot volumes. The different barrel injection portions, barrel end caps and tip assemblies generally differ with respect to the inner diameter of the barrel injection portion, the outer diameter of the tip assembly and the rearward facing recess in the barrel end cap, which together define a respective shot volume.

The modular approach provides numerous significant advantages over common existing barrel and screw assemblies being used in injection molding. By splitting the length of a barrel into a barrel body and a barrel injection portion, this permits fabrication of a barrel body from a shorter core or blank. This makes for easier, more efficient and less expensive handling and fabrication. In turn, each barrel injection portion may be fabricated from a much shorter core or blank, because it only provides the portion of the barrel that is related to the stroke of the screw tip assembly and shot volume. Additionally, any sort of connecting hardware may be utilized to connect the barrel body and barrel injection portion, such as for example, common removable annular collars and fasteners, such as bolts. Thus, a variety of barrel injection portions may be fabricated with a common outer diameter and length, which may be significantly smaller in diameter than common annular collars, which may be used with common fasteners. The different barrel injection portions may have passages with different inner diameters to provide different shot volumes. However, there also is an opportunity to utilize cores or blanks of differing outer diameters for different barrel injection portions, which then may require less costly cores or blanks but would require annular collars with corresponding different internal diameters. Alternative connecting hardware may use fixed collars or flanges and other fasteners to removably connect the components. While fasteners, such as bolts, are used to connect the barrel end cap to the barrel injection portion in the present example, alternative structures and fasteners may be used, as desired.

Further advantages include that removal of the barrel injection portion, while leaving the barrel body in place, will make readily accessible the screw tip assembly to permit servicing, inspection and replacement of the screw tip assembly or components thereof. This, in turn, permits continued use of a single barrel body portion that may be connected to the injection molding machine and hopper, while the much shorter barrel injection portion having the greater wear may be easily replaced at much less expense. These advantages are present regardless of whether one seeks to repeatedly use a single shot volume or to use barrel injection portions of different sizes for different shot volumes.

In fact, a key advantage is that the shot volume may be changed, within a range of volumes, without changing the barrel body. Thus, any one of, for example, three or more different shot volumes may be achieved with a common barrel body by removably installing different barrel injection portions and their corresponding barrel end caps and screw tip assemblies. This provides great flexibility in manufacturing, while significantly reducing the cost of equipment due to the shared barrel body. The passage through the barrel body also may have a single inner diameter or may vary along its length, as desired, but will always be used with the same common screw portion. Moreover, any difference in the inner diameter at the front end of the barrel body and the rear end of the barrel injection portion may be accounted for by use of a unique annular seal disposed between the barrel body and barrel injection portion. To avoid fluid flow disruption, turbulence or stagnation, each annular seal has a passage and an inner diameter at a rear end of the passage that is sized to match the inner diameter at the front end of the barrel body passage. In turn, the passage of each annular seal has an inner diameter at the front end that is sized to match the inner diameter at the rear of the respective barrel injection portion to which it corresponds. Thus, the passage through the annular seal may have a single inner diameter from its rear end to the front end, or the inner diameter at the front of the seal may be larger than the inner diameter at the rear of the annular seal, and there may be multiple alternative annular seals having different larger inner diameters for assemblies yielding different shot volumes.

Also advantageously, each respective barrel injection portion and barrel end cap for a given shot volume may remain connected together, such that when there is a desire to change the shot volume of an injection molding set up, the barrel injection portion is disconnected from the barrel body, the screw tip assembly is disconnected from the screw portion, a different sized screw tip assembly is connected to the screw portion and a corresponding different sized pre-assembled barrel injection portion and barrel end cap are connected to the barrel body. This permits more rapid, less labor-intensive changes of components to affect a change in shot volume. It is possible to have multiple shot volumes associated with a common barrel body and screw portion. In addition, it will be appreciated that with any one of the variety of different sized barrel injection portions, barrel end caps and screw tip assemblies, still further additional different shot volumes may be derived by limiting the stroke of the screw assembly.

As noted above and explained further in the present disclosure, the example modular barrel and screw assembly and methods of installing and operating the devices provide several advantages over the prior art. It also is to be understood that both the foregoing general description and the following detailed description are exemplary and provided for purposes of explanation only. They are not restrictive of the claimed subject matter. Further features and objects of the present disclosure will become more fully apparent in the following description of the preferred embodiments and from the appended claims.

BRIEF DESCRIPTION OF DRAWINGS

In describing the preferred embodiments, reference is made to the accompanying drawing figures wherein like parts have like reference numerals, and wherein.

It should be understood that the drawings are not necessarily to scale. While some details of the example modular barrel and screw assembly, including potential alternative configurations, have not been included, such details are considered within the comprehension of those of skill in the art, in light of the present disclosure. It also should be understood that the present invention is not limited to the example embodiments illustrated.

DETAILED DESCRIPTION OF THE PREFERRED EMBODIMENTS

Figure 1:
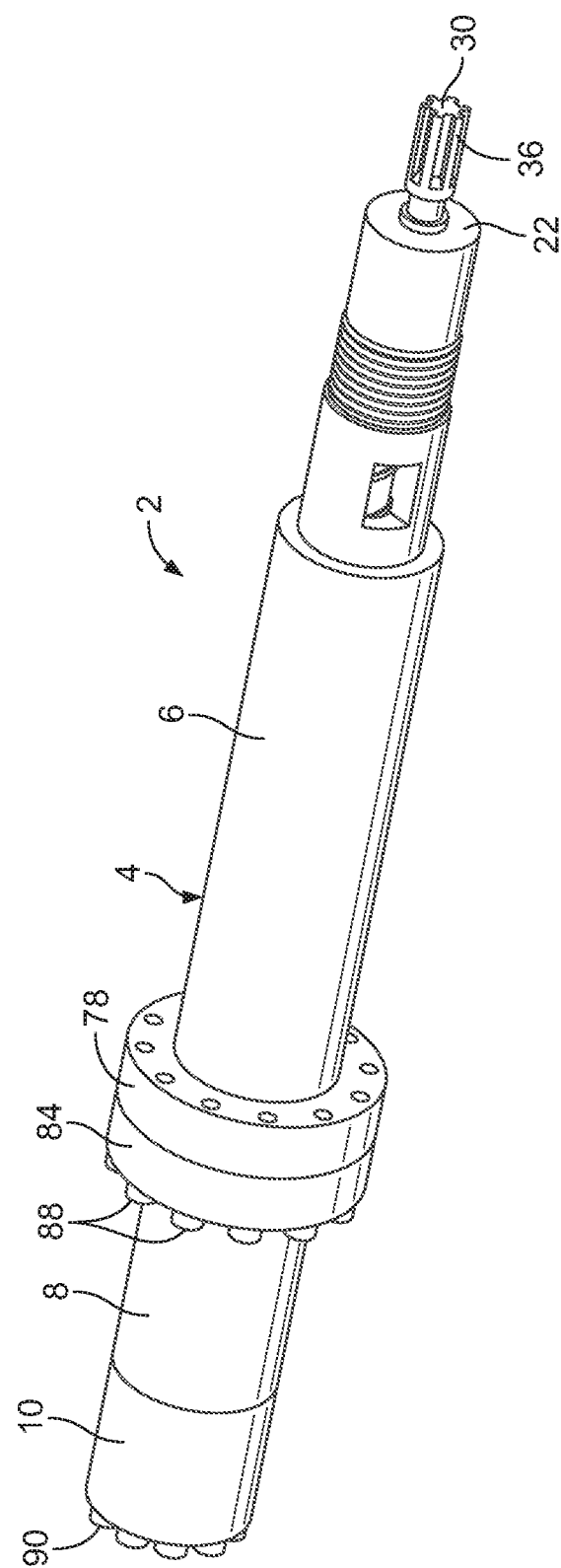
FIG. 1 is a rear left perspective view of an example modular barrel and screw assembly.
Figure 2:
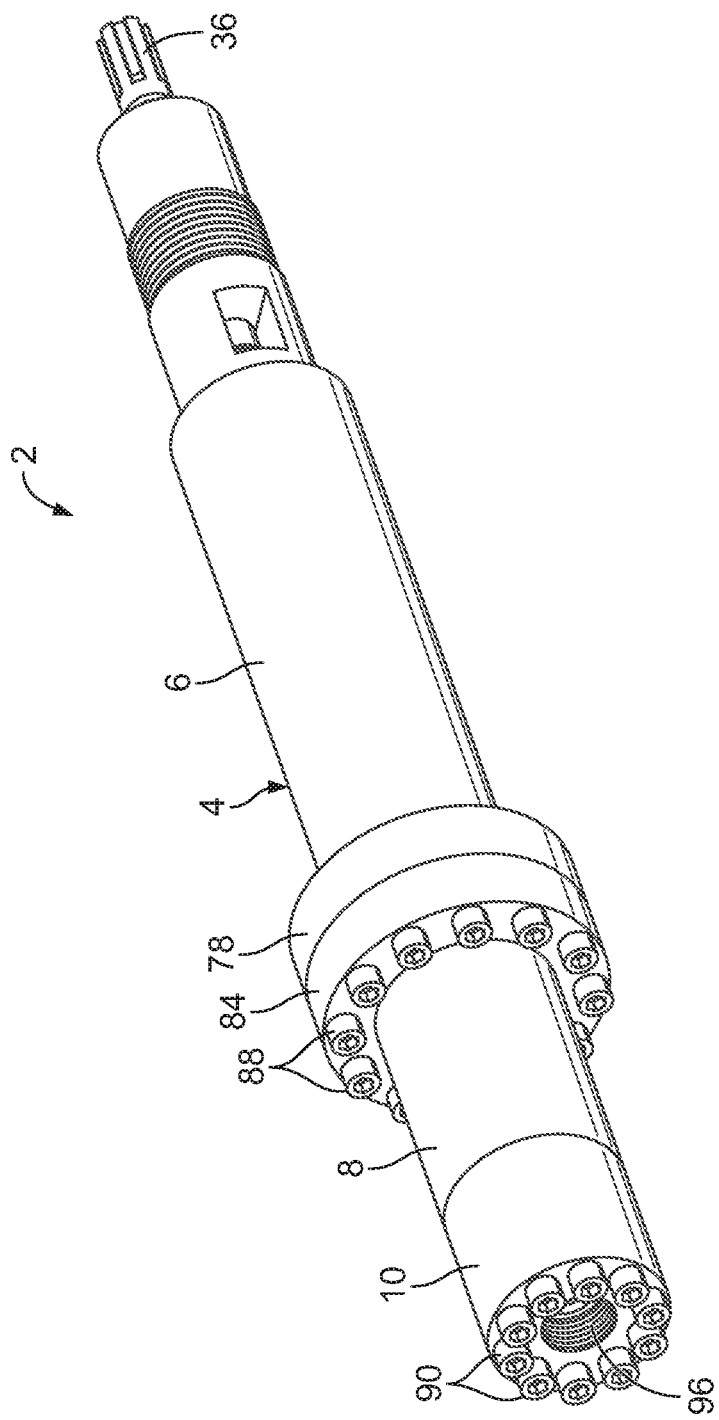
FIG. 2 is a front left perspective view of the example modular barrel and screw assembly shown in FIG. 1.
Figure 3:
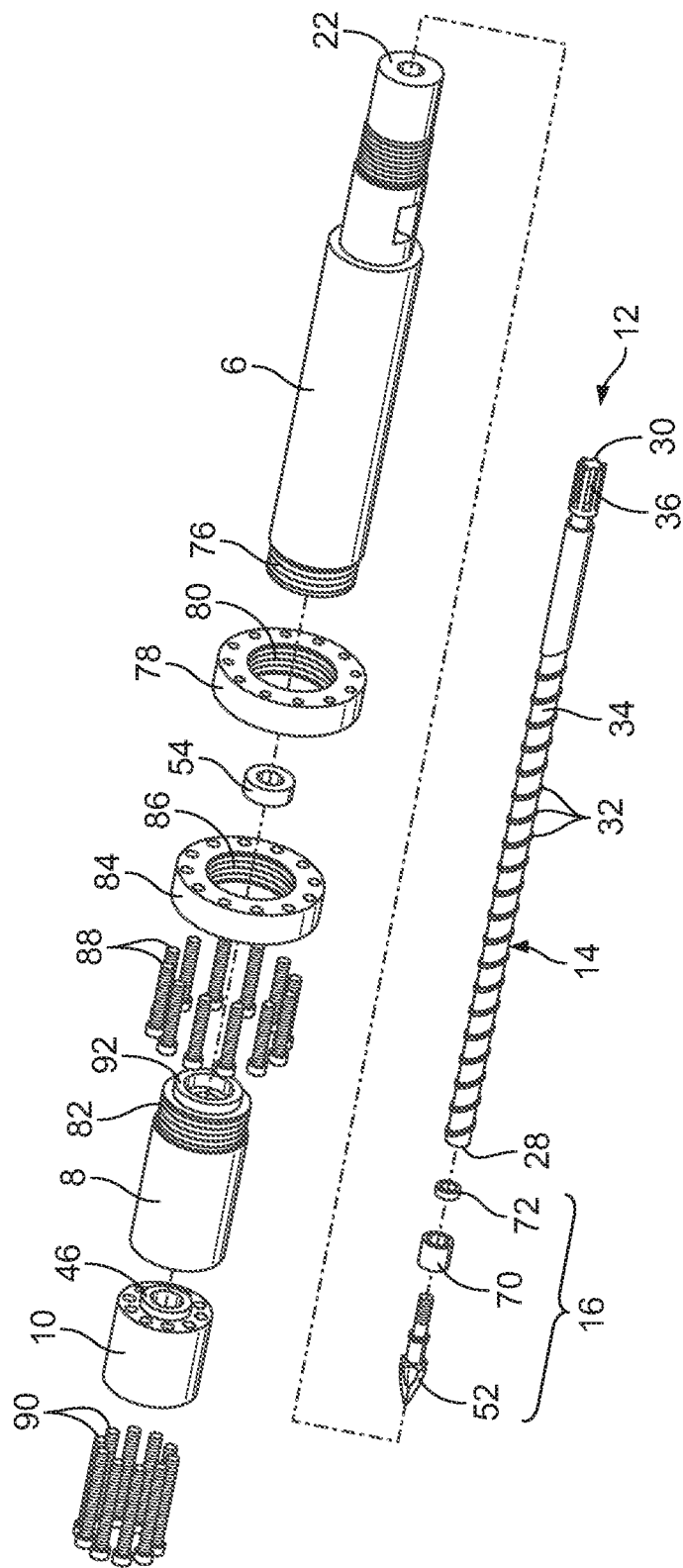
FIG. 3 is a rear left exploded perspective view of the example modular barrel and screw assembly shown in FIG. 1.

Turning to FIGS. 1-8, an example modular barrel and screw assembly 2 of the present disclosure is shown and will be described. FIGS. 1 and 2, show the barrel and screw assembly 2, which is for use in injection molding and includes a barrel 4 having a barrel body 6, a separate barrel injection portion 8 and a separate barrel end cap 10. The barrel body 6 may be mounted to an injection molding machine in any of the common ways presently known in the art, and the present example includes a threaded outer surface to receive a corresponding threaded annular collar for such purposes. It is contemplated that the rear end of the barrel body may be configured in any one of a number of other ways, so as to be connected to an injection molding machine, and typically would be configured for connection to machines based on mounting configurations favored by specific machine suppliers.

The barrel end cap 10 is removably connected to the barrel injection portion 8 and the barrel injection portion 8 is removably connected to the barrel body 6. Also included in the barrel and screw assembly 2 is a screw assembly 12 having a screw portion 14 and a screw tip assembly 16. The screw tip assembly 16 is removably connected to the screw portion 14. It will be appreciated that an injection chamber 18 having a shot volume is defined by the barrel injection portion 8, the barrel end cap 10 and the screw tip assembly 16.

The barrel body 6 has a passage 20 that extends from a rear end 22 to a front end 24, with a front end of the passage 26 having an inner diameter. The screw portion 14 includes a front end 28 and rear end 30. Flights 32 extend around a main shaft 34 in a helical manner to effectively provide an auger. The rear end 30 of the screw portion 14 includes a shank 36. It will be appreciated that the rear end 22 of the barrel body 6 is to be connected to an injection molding machine (not shown). The shank 36 of the screw portion 14 would be coupled to a drive mechanism. The drive mechanism would include a motor to rotate the shank 36 and an injection cylinder, such as a hydraulic actuator or other means of providing translational fore and aft movement, which would force the screw portion 14 forward during an injection cycle. Thus, the screw portion 14 rotates and reciprocates within the barrel body 6.

The screw portion 14 extends within the passage 20 of the barrel body 6 and rearward from the rear end 22 of the barrel body 6. The barrel injection portion 8 has a passage 38 that extends from a rear 39 end to a front end 41, with the passage 38 having a minimum inner diameter of sufficient size to receive the front end 28 of the screw portion 14. The rear end 39 of the barrel injection portion 8 is removably connected to the front end 24 of the barrel body 6. The barrel end cap 10 has a passage 40 extending from a rear end 42 to a front end 44, with a forward extending nozzle portion 48 and a rearward facing recess 50 extending between the rear end 42 and the nozzle portion 48. The screw tip assembly 16 is to be received within the passage 38 of the barrel injection portion 8. This includes the screw tip assembly 16 having a front end 52 sized and shaped to be received by the recess 50 in the barrel end cap 10 when the screw tip assembly 16 is removably connected to the front end 28 of the screw portion 14 and in a forwardmost position, such as may be seen in FIGS. 4 and 6.

An annular seal 54 has a passage 56 sized at a rear end 58 to match the inner diameter of the passage 20 at the front end 24 of the barrel body 6 and sized at a front end 60 to match the inner diameter of the passage 38 at the rear end 39 of the barrel injection portion 8. This may be best appreciated in FIGS. 7 and 8. Importantly, FIG. 8 includes two additional configurations of barrel injection portions 8a, 8b, barrel end caps 10a, 10b, and screw tip assemblies 16a, 16b, which would provide different shot volumes. The components of the additional different sized examples are labeled with like numbers, differing by inclusion of an "a" or "b" for the respective additional configurations. It will be understood that the description of the example shown in FIGS. 1-7 would apply similarly to the two additional alternatives shown in FIG. 8, and therefore, while labeled to reflect their similarity, the additional alternatives do not necessarily require a redundant description.

Figure 8:
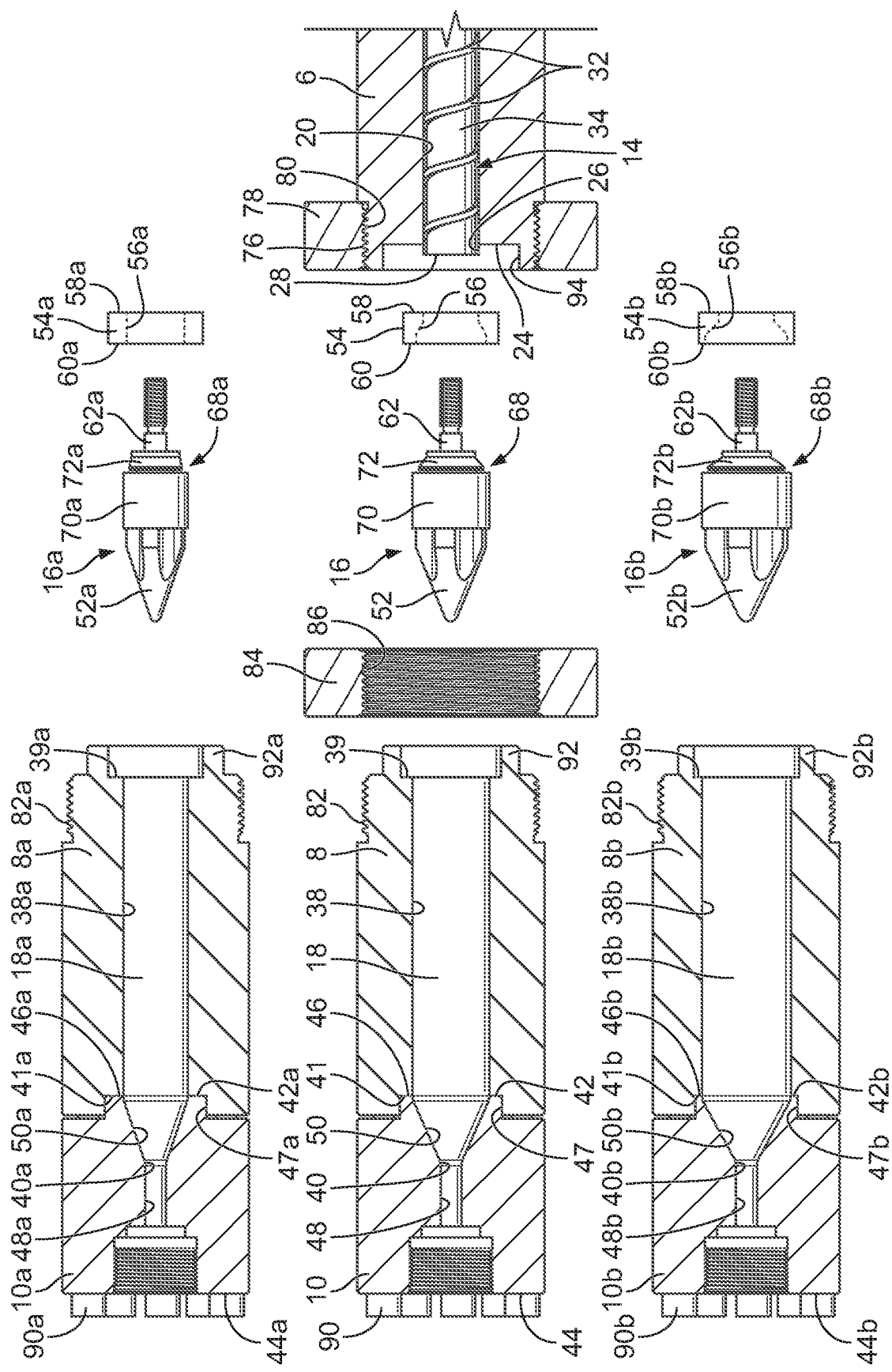
FIG. 8 is a partial cross-sectional and partially exploded view showing in a central location the front end of the barrel body, barrel end cap and screw assembly shown in FIGS. 1-7, and two alternative front barrel module, barrel end cap and screw assemblies that provide additional potential shot volumes not otherwise attainable only with the centrally located assembly.

For example, in the upper alternative example in FIG. 8, a smaller shot volume is provided by the barrel injection portion 8a having a passage 38a having an inner diameter that is the same as the inner diameter of the passage 20 at the front end 24 of the barrel body 6, and the barrel end cap 10a has a smaller rearward facing recess 50a in the passage 40a, which corresponds to a smaller front end 52a of a screw tip assembly 16a. Alternatively, in the lower example in FIG. 8, a larger shot volume is provided by the barrel injection portion 8b having a passage 38b having an inner diameter that is larger than the inner diameter of the passage 20 at the front end 24 of the barrel body 6, and the barrel end cap 10b has a larger rearward facing recess 50*b* in the passage 40*b*, which corresponds to a larger front end 52*b* of a screw tip assembly 16*b*. Thus, although not shown to scale, the inner diameters of the respective passages 38*a*, 38 and 38*b* of the barrel injection portions 8*a*, 8 and 8*b* may for example be 28 mm, 36 mm and 40 mm, with corresponding adjustments in size to the respective barrel end portions, screw tip assemblies and annular seals, so as to yield three different shot volumes while utilizing the same barrel body 6. Indeed, it will be appreciated that there certainly may be a plurality of more than three different sizes and shot volumes, as well.

It will be appreciated that with the inner diameter of the passage 20 at the front 24 of the barrel body 6 being smaller than the inner diameter of the passage 38 at the rear 30 of the barrel injection portion 8, to avoid issues of flow, the annular seal 54 has a passage 56 having a smaller inner diameter at the rear end 58 than the relatively larger inner diameter at the front end 60 of the annular seal 54. There will be a range in permissible different inner diameters of the passages through alternative barrel injection portions, from an inner diameter that is the same as that of the passage at the front end of the barrel portion 6 to inner diameters that are larger. The respective annular seals 54*a*, 54 and 54*b* provide a passage 56*a*, 56 and 56*b* having an inner diameter at the rear end 58*a*, 58 and 58*b* that matches the inner diameter of the passage 20 at the front end of the barrel body 6, and an inner diameter at the front end 60*a*, 60 and 60*b* that matches the inner diameter at the rear end of the barrel injection portion 8*a*, 8 and 8*b*. The passage 56 through the annular seal 54 is shaped to accommodate the similarity or difference in inner diameters, such as by passing straight through or by being somewhat flared from the rear end to the front end.

The front end 52 of the screw tip assembly 16 is part of a tip member 62 that has a stem 64, which is removably connected to the front end 28 of the screw portion 14. In this example, the stem 64 is threaded and is threadably received by a threaded recess 66 in the front end 28 of the screw portion 14. The tip member 62 also is removably connected to a valve assembly 68. In this example, the valve assembly 68 includes a ring 70 and a seat 72 that are connected to the stem 64. The ring 70 is movable relative to the seat 72 between an open position, shown in FIG. 7 wherein the ring 70 is spaced from the seat 72, and a closed position wherein the ring 70 engages the seat 72, as would occur if the tip member 62 is forced rearward relative to the screw portion 14, or the screw portion 14 is forced forward, such as when acting as a plunger during an injection cycle. It will be appreciated that while a movable ring 70 and seat 72 are shown, other valve assembly structures may be utilized, which may for example, include a ball check valve within the tip member 62, or other suitable structures internal to or external to the tip member to temporarily stop the flow of the fluid.

The removable connection of the barrel body 6 and barrel injection portion 8 may be by any suitable connecting structures. In the example shown, an outer surface 76 of the front end 24 of the barrel body 6 is threaded and removably receives an annular collar 78 having a threaded inner surface 80. In turn, an outer surface 82 of the rear end 39 of the barrel injection portion 8 is threaded and removably receives an annular collar 84 having a threaded inner surface 86. A plurality of first fasteners 88 then are used to removably connect the annular collar 78 at the front end 24 of the barrel body 6 to the annular collar 84 at the rear end 39 of the barrel injection portion 8. Hence, the example shown uses structures that can be easily manipulated to connect the barrel body 6 to the barrel injection portion 8, with an annular seal 54 disposed therebetween. The respective threaded collars 78, 84 are removably connected by the plurality of first fasteners 88, in the form of bolts, but it will be appreciated that other connecting structures may be utilized.

Removable connection of the barrel end cap 10 to the barrel injection portion 8 also may be by any suitable connecting structures. The structures shown in the example include a plurality of second fasteners 90 that removably connect the rear end 42 of the barrel end cap 10 to the front end 41 of the barrel injection portion 8. Thus, the example uses structures that can be easily manipulated by use of similar tools to connect the barrel end cap 10 to the barrel injection portion 8. If desired, a seal may be installed between the two components. The respective plurality of second fasteners 90 may be in the form of bolts, and for convenience, they may be similar to the first fasteners 88. The barrel end cap 10 also may include a rearward annular shoulder 46 that may be received by a forward facing recess 47 in the front of the barrel injection portion 8.

Connection of the barrel injection portion 8 to the barrel body 6 is aided by the rear end 39 of the barrel injection portion 8 having an annular shoulder 92 extending rearward and located between the passage 38 through the barrel injection portion 8 and an outer surface 86 of the rear end 39 of the barrel injection portion 8. The shoulder 92 is received in a forward facing annular recess 94 in the front end 24 of the barrel body 6 located between the passage 20 through the barrel body 6 and an outer surface 76 of the barrel body 6 when the barrel injection portion 8 is connected to the barrel body 6. Thus, while the annular recess 94 effectively enlarges the passage through the barrel body 6, it is not contacted by material passing through the barrel 4 but rather receives the shoulder 92 of the barrel injection portion 8 and the annular seal 54.

It will be appreciated that the barrel end cap 10 will be connected to a mold (not shown) for injection molding purposes. As such, the front end 44 of the barrel end cap 10 may include a connector 96 used to connect the barrel and screw assembly 2 to a mold. In the example shown, the connector 96 at the front end 44 of the barrel end cap 10 is configured as a threaded recess. The connector 96 provides direct access to the nozzle 48 for injection purposes. It will be appreciated that various other suitable structures may be provided for connection of a barrel end cap to a mold.

As will be appreciated in FIG. 8, for comparison purposes of three sizes, the upper example barrel injection portion 8*a*, barrel end cap 10*a* and screw tip assembly 16*a* may be considered a first example, wherein the inner diameter of the passage 38*a* in the barrel injection portion 8*a* corresponds to the inner diameter of the passage 20 at the front end 24 of the barrel body 6. As such, a second set up may be provided when the first has been disconnected. Thus, there may be provided a separate barrel injection portion 8 and a second separate barrel end cap 10, with the second barrel end cap 10 being removably connected to the second barrel injection portion 8, and a second screw tip assembly 16 may be removably connected to the screw portion 14, with the second barrel injection portion 8 being removably connected to the barrel body 6 when the screw tip assembly 16*a* has been removed from the screw portion 14 and the barrel injection portion 8*a* has been removed from the barrel body 6, This results in a second injection chamber 18 having a second shot volume being defined by the second barrel injection portion 8, the second barrel end cap 10 and the second screw tip assembly 16, with the second shot volume being larger than the shot volume defined by the barrel injection portion 8a, the barrel end cap 10a and the screw tip assembly 16a.

Thus, within such a second example as shown in FIG. 8, the barrel body 6 has a passage 20 that extends from a rear end 22 to a front end 24, with a front end 28 of the passage 20 having an inner diameter. The screw portion 14 extends within the passage 20 of the barrel body 6 and rearward from the rear end 22 of the barrel body 6. The second barrel injection portion 8 has a passage 38 that extends from a rear end 39 to a front end 41, with the passage 38 having a minimum inner diameter of sufficient size to receive a front end 28 of the screw portion 14. The rear end 32 of the second barrel injection portion 8 is removably connected to the front end 24 of the barrel body 6. The second barrel end cap 10 has a passage 40 extending from a rear end 42 to a front end 44. The passage 40 includes a forward extending nozzle portion 48 and the passage 40 has a rearward facing recess 50 extending between the rear end 42 and the nozzle portion 48. The second screw tip assembly 16 is sized to be received within the passage 38 of the second barrel injection portion 8 and has a front end 52 sized and shaped to be received by the rearward facing recess 50 in the second barrel end cap 10 when removably connected to a front end 28 of the screw portion 14 and when the second screw tip assembly 16 is in a forwardmost position. A second annular seal 54 has a passage 56 sized at a rear end 58 to match the inner diameter of the passage 20 at the front end 24 of the barrel body 6 and sized at a front end 60 to match the inner diameter of the passage 38 at the rear end 39 of the second barrel injection portion 8.

For clarity, the third example, having the largest shot volume will be briefly further described. A third separate barrel injection portion 8b and a third separate barrel end cap 10b are provided, with the third barrel end cap 10b being removably connected to the third barrel injection portion 8b and a third screw tip assembly 16b is removably connected to the screw portion 14 and the third barrel injection portion 8b being removably connected to the barrel body 6 when the screw tip assembly 16 has been removed from the screw portion 14 and the barrel injection portion 8 has been removed from the barrel body 6. A third injection chamber 18b has a third shot volume that is defined by the third barrel injection portion 8b, the third barrel end cap 10b and the third screw tip assembly 16b. The third shot volume is larger than the shot volume defined by the barrel injection portion 8a, the barrel end cap 10a and the screw tip assembly 16a, as well as the second shot volume defined by the second barrel injection portion 8, the second barrel end cap 10 and the second screw tip assembly 16.

Hence, within such a third example as shown in FIG. 8, the barrel body 6 has a passage 20 that extends from a rear end to a front end, with a front end of the passage 20 having an inner diameter. The screw portion 14 extends within the passage 20 of the barrel body 6 and rearward from the rear end 22 of the barrel body 6. The third barrel injection portion 8b has a passage 38b that extends from a rear end 39b to a front end 41b, with the passage 38b having a minimum inner diameter of sufficient size to receive a front end 28 of the screw portion 14. The rear end 32b of the third barrel injection portion 8b is removably connected to the front end 24 of the barrel body 6. The third barrel end cap 10b has a passage 40b extending from a rear end 42b to a front end 44b. The passage 40b includes a forward extending nozzle portion 48b and the passage 40b has a rearward facing recess 50b extending between the rear end 42b and the nozzle portion 48b. The third screw tip assembly 16b is sized to be received within the passage 38b of the third barrel injection portion 8b and has a front end 52b sized and shaped to be received by the rearward facing recess 50b in the third barrel end cap 10b when removably connected to a front end 28 of the screw portion 14 and when the third screw tip assembly 16b is in a forwardmost position. As with the first barrel injection portion 8a and second barrel injection portion 8, the third barrel injection portion 8b would include a shoulder 92b that is received in the annular recess 94 in the front end 24 of the barrel body 6.

The modular barrel and screw assembly 2 of the present disclosure provides for enhanced serviceability, as well as the ability to quickly and conveniently change to alternative shot volumes for use with other molds. The screw tip assembly 16 may be readily accessed by removal of the barrel injection portion 8 from the barrel body 6. This permits inspection of the higher wear areas, such as the injection chamber 18, the screw tip 52, and the valve assembly 68, such as the example ring 70 and seat 72, connected to the screw tip assembly 16. This facilitates replacement of any such worn components or removal and installation of components of a different size to yield a different shot volume. It will be appreciated that the valve assembly 68 will be located beyond the front end 24 of the passage 20 through the barrel body 6. Therefore, with the barrel injection portion 8 removed, the front end 28 of the screw portion 14 extends forward of the front end 24 of the passage 20 through the barrel body 6, such that the ring 70 and seat 72 of the valve assembly 68 are readily accessible for inspection, servicing or replacement. Also, when the barrel injection portion 8 is connected to the front end 24 of the barrel body 6, the screw portion 14 may be of a length wherein the valve assembly 68 is at all times located within the barrel injection portion 8 when the barrel injection portion 8 is connected to the barrel body 6. This ensures that the ring 70, seat 72 and connection of the rear end 39 of the barrel injection portion 8 to the front end 24 of the barrel body 6 is never subjected to the higher pressure that occurs in the barrel injection chamber 18 during the injection stroke of the screw assembly 12, and instead is subjected to the lower pressure along the flights 32 of the screw portion 14 behind the valve assembly 68.

Figure 4:
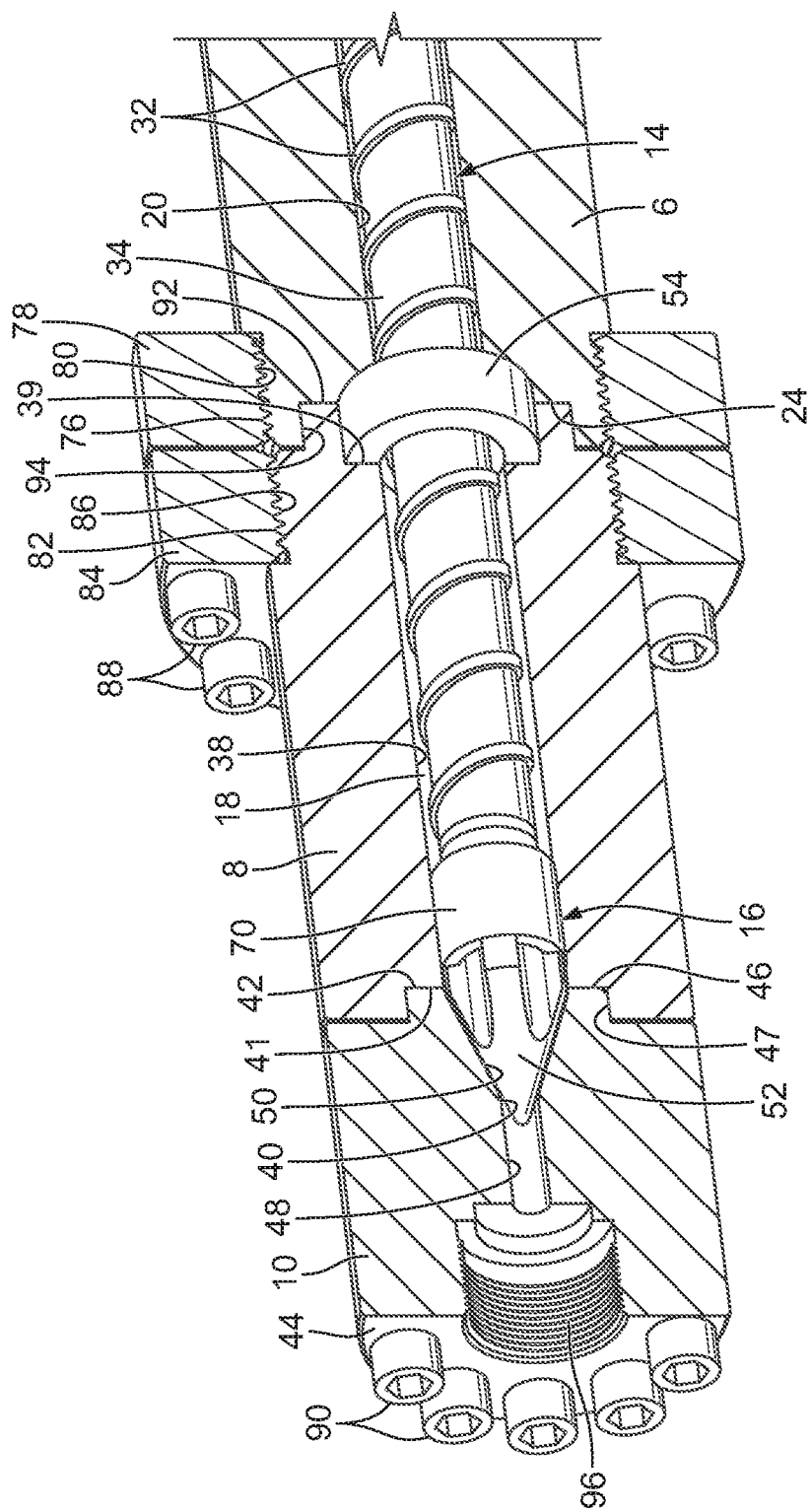
FIG. 4 is an enlarged partial cross-sectional view of a front portion of the example modular barrel and screw assembly shown in FIG. 1, including an assembled front end of a barrel body, a front barrel module and barrel end cap, with the screw assembly in a forwardmost position.
Figure 5:
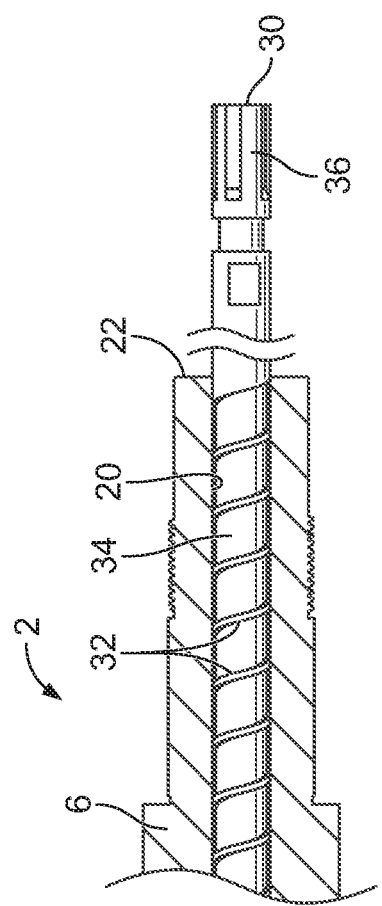
FIG. 5 is a partial cross-sectional view of the example modular barrel and screw assembly shown in FIG. 1, with the screw assembly in a rearmost position.
Figure 5:
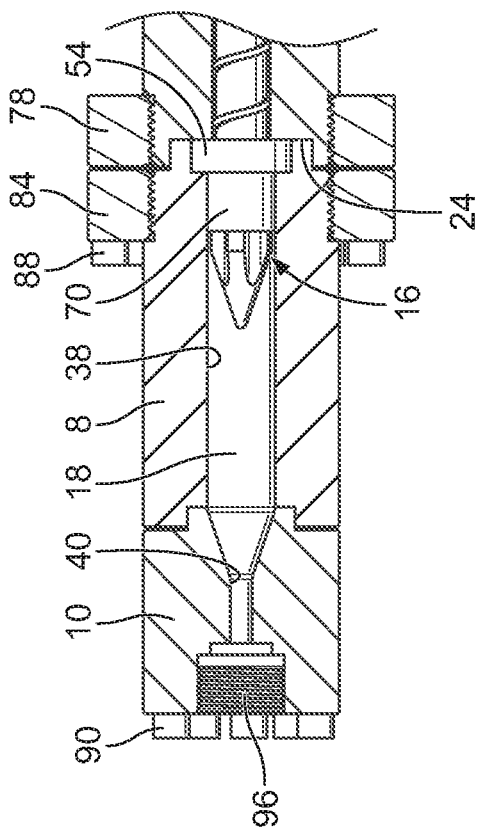
Figure 6:
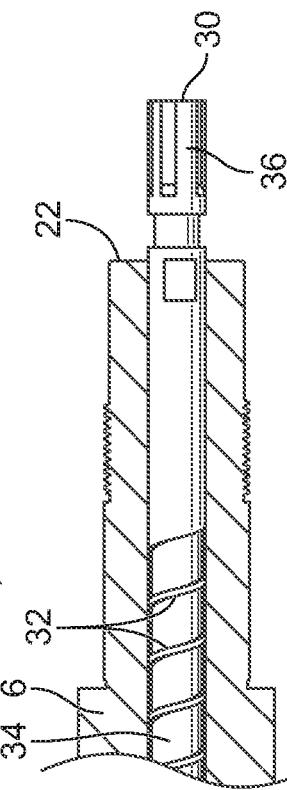
FIG. 6 is a partial cross-sectional view of the example modular barrel and screw assembly shown in FIGS. 1, 4 and 5, with the screw assembly in the forwardmost position.
Figure 6:
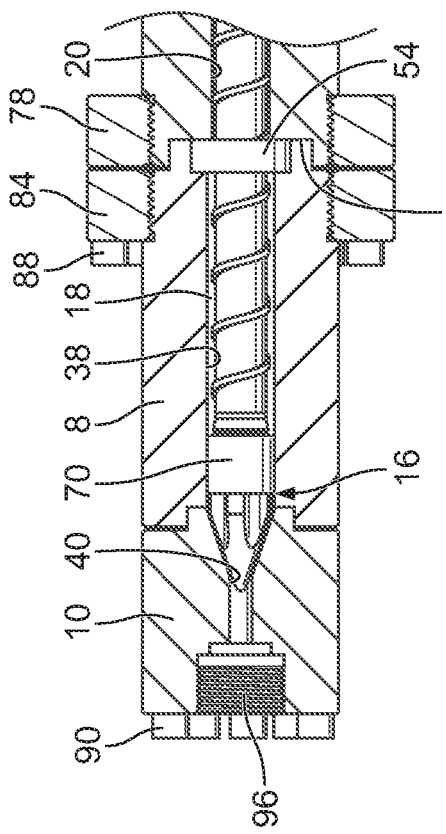
Figure 7:
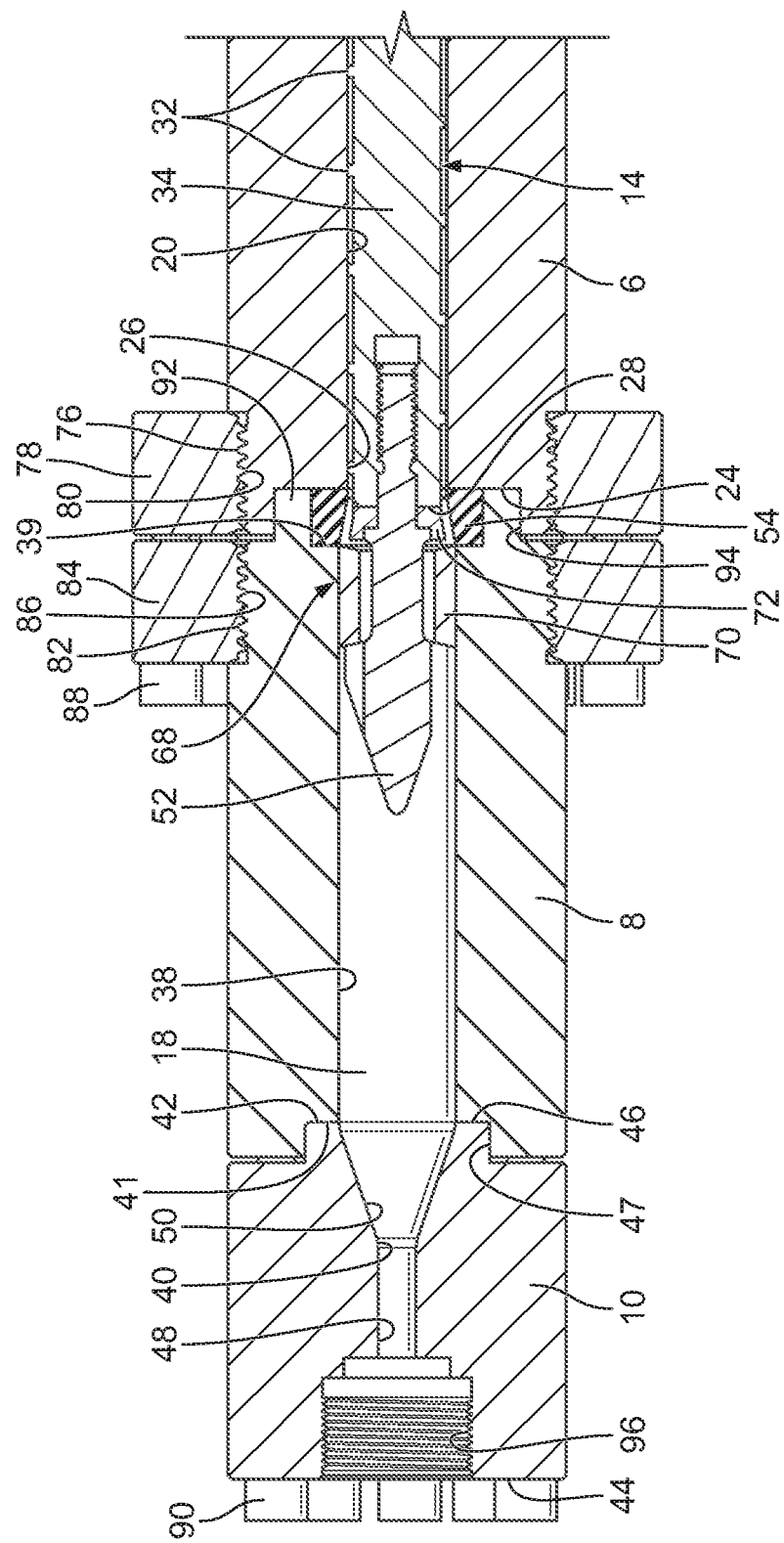
FIG. 7 is a cross-sectional view of the front portion of the example modular barrel and screw assembly shown in FIG. 4, showing the tip assembly in cross-section and the screw assembly in a nearly rearmost position. front right upper perspective view of a portion of the inserter hopper device shown in FIG. 1.

The present disclosure permits use of common heat wraps around the barrel body 6 and potentially around the barrel injection portion 8. The components also may permit use of common tools and methods of assembling and disassembling components, without necessarily requiring specialized tools, knowledge or training. The components also will be understood to function in general in a similar manner, with the rotating and reciprocating elongated screw assembly 12 being moved by the drive mechanism of an injection molding machine. Thus, the motor would rotate the shank 36 and the flights 32 on the shaft 34 of the screw portion 14 would force the material fed from a hopper to move forward within the barrel body 6 as it is heated and melted to become a liquid. As the liquid passes through the valve assembly 68 in a forward direction, the liquid will fill the injection chamber 18 and force the screw assembly 12 rearward. When the screw assembly 12 is in its rearmost position, as shown in FIG. 5, the ring 70 will be forced rearward and will engage the seat 70, closing the valve assembly 68. The screw tip assembly 16 then acts as a plunger as an injection cylinder of the drive mechanism of the injection molding machine forces the screw portion 14 forward during an injection cycle. As the screw assembly 12 is forced in a forward direction toward the mold, the fluid in the injection chamber 18 is forced through the nozzle 48 and injected into the mold until the screw assembly 12 is in a forwardmost position, as shown in FIGS. 4 and 6. The valve assembly 68 then is subject to being forced open by fluid being fed forward and moving the ring 70 to disengage from the seat 72, such that the screw assembly 12 is again forced reward for another injection cycle. FIG. 7 represents a position just prior to the rearmost position, just prior to the ring 70 being forced rearward by the tip member 62 and into engagement with the seat 72.

Although the present subject matter is described herein with reference to specific structures, methods and examples, this is for purposes of illustration only, and it is understood that the present subject matter is applicable to a large range of devices that may differ in particular configuration and appearance while still employing this subject matter. This patent is only limited by the appended claims and legal equivalents thereof.

The invention claimed is:

1. A modular barrel and screw assembly having a plurality of shot volumes for use in injection molding comprising:
   a barrel having a barrel body, wherein the barrel body has a passage that extends from a rear end to a front end of the barrel body, with a front end of the passage having an inner diameter;
   a screw portion extending within the passage of the barrel body;
   a plurality of alternative respective corresponding separate barrel injection portions, separate barrel end caps and separate screw tip assemblies, with each respective corresponding barrel end cap configured to be removably connected to the respective corresponding barrel injection portion, each respective corresponding barrel injection portion configured to be removably connected to the barrel body, and each respective corresponding screw tip assembly configured to be removably connected to the screw portion;
   wherein a plurality of respective corresponding injection chambers having a plurality of respective corresponding different shot volumes are defined by the plurality of respective corresponding barrel injection portions, barrel end caps and screw tip assemblies;
   the respective plurality of barrel injection portions each having a different inner diameter at a rear end of a passage therethrough;
   the respective plurality of barrel end caps each having a passage therethrough including a forward extending nozzle portion and a rearward facing recess that extends between the rear end of the respective barrel end cap and the nozzle portion thereof, with the inner diameter at the rear of the recess corresponding to the inner diameter of the respective corresponding barrel injection portion; and
   a respective corresponding plurality of annular seals having a passage therethrough, wherein each respective annular seal has a similar inner diameter at a rear end of the passage therethrough which is sized to match the inner diameter at the front end of the passage through the barrel body, and each said respective annular seal has a different inner diameter at a front end of the respective passage therethrough which is sized to match the respective corresponding inner diameter of the passage at the rear end of the respective corresponding barrel injection portion.

2. A modular barrel and screw assembly having a plurality of shot volumes for use in injection molding comprising:
   a barrel having a barrel body, wherein the barrel body has a passage that extends from a rear end to a front end of the barrel body, with a front end of the passage having an inner diameter;
   a screw portion extending within the passage of the barrel body;
   a separate first barrel injection portion having a passage that extends from a rear end to a front end of the barrel injection portion, with the passage having an inner diameter at the rear end of the first barrel injection portion of sufficient size to receive a front end of the screw portion, and the rear end of the first barrel injection portion configured to be removably connected to the front end of the barrel body;
   a separate first barrel end cap having a passage that extends from a rear end to a front end of the first barrel end cap, with the passage including a forward extending nozzle portion and the passage having a rearward facing recess extends between the rear end of the first barrel end cap and the nozzle portion thereof, with the rear end of the first barrel end cap configured to be removably connected to the front end of the first barrel injection portion;
   a first screw tip assembly configured to be removably connected to the screw portion;
   a first annular seal having a passage sized at a rear end to match the inner diameter of the passage at the front end of the barrel body and sized at a front end to match the inner diameter of the passage at the rear end of the first barrel injection portion;
   wherein a first injection chamber having a first shot volume is defined by the first barrel injection portion, the first barrel end cap and the first screw tip assembly when the first barrel injection portion is connected to the front end of the barrel body, the first barrel end cap is connected to the first barrel injection portion and the first screw tip assembly is connected to the front end of the screw portion; and
   further comprising a separate second barrel injection portion having a passage that extends from a rear end to a front end of the second barrel injection portion, with the passage having an inner diameter at the rear end of the second barrel injection portion of sufficient size to receive a front end of the screw portion, and rear end of the second barrel injection portion configured to be removably connected to the front end of the barrel body;
   a separate second barrel end cap having a passage that extends from a rear end to a front end of the second barrel end cap, with the passage including a forward extending nozzle portion and the passage having a rearward facing recess that extends between the rear end of the second barrel end cap and the nozzle portion thereof, with the rear end of the second barrel end cap configured to be removably connected to the front end of the second barrel injection portion;
   a second screw tip assembly configured to be removably connected to the screw portion;
   a second annular seal having a passage sized at a rear end to match the inner diameter of the passage at the front end of the barrel body and sized at a front end to match the inner diameter of the passage at the rear end of the second barrel injection portion, wherein the inner diameter of the passage at the rear end of the second barrel injection portion is different than the inner diameter of the passage at the rear end of the first barrel injection portion;

wherein a second injection chamber having a second shot volume is defined by the second barrel injection portion, the second barrel end cap and the second screw tip assembly when the second barrel injection portion is connected to the front end of the barrel body, the second barrel end cap is connected to the second barrel injection portion, and the second screw tip assembly is connected to the front end of the screw portion, and the second shot volume is of different size than the first shot volume.

3. The modular barrel and screw assembly of claim 2, wherein the screw portion rotates and reciprocates within the barrel body and the rearward extension of the screw portion from the rear end of the barrel body includes a shank.

4. The modular barrel and screw assembly of claim 2, wherein the first screw tip assembly further comprises a first tip member defining the front end of the first screw tip assembly and having a stem that is removably connected to the front end of the screw portion, and a valve.

5. The modular barrel and screw assembly of claim 4, wherein the stem is threaded and is threadably received by a threaded recess in the front end of the screw portion.

6. The modular barrel and screw assembly of claim 4, wherein the valve is a one-way valve that includes a ring and seat connected to the stem.

7. The modular barrel and screw assembly of claim 6, wherein the ring is movable relative to the seat between an open position wherein the ring is spaced from the seat and a closed position wherein the ring engages the seat.

8. The modular barrel and screw assembly of claim 2, wherein an outer surface of the front end of the barrel body is threaded and removably receives an annular collar having a threaded inner surface, and each of the first and second barrel injection portions has an outer surface of the rear end of the respective barrel injection portion that is threaded and removably receives a second annular collar having a threaded inner surface.

9. The modular barrel and screw assembly of claim 8, wherein a plurality of first fasteners removably connect the annular collar at the front end of the barrel body to the second annular collar at the rear end of the respective first or second barrel injection portion.

10. The modular barrel and screw assembly of claim 9, wherein a plurality of second fasteners removably connect the rear end of the first barrel end cap to the front end of the first barrel injection portion or removably connect the rear end of the second barrel end cap to the front end of the second barrel injection portion.

11. The modular barrel and screw assembly of claim 2, wherein the rear end of the each of the first and second barrel injection portions includes an annular shoulder extending rearward and located between the passage through the respective first or second barrel injection portion and an outer surface of the rear end of the respective first or second barrel injection portion and the annular shoulder is configured to be received in an annular recess in the front end of the barrel body located between the passage through the barrel body and an outer surface of the barrel body when the respective first or second barrel injection portion is connected to the barrel body.

12. The modular barrel and screw assembly of claim 2, wherein the front end of the respective first or second barrel end cap further comprises a connector used to connect the barrel and screw assembly to a mold.

13. The modular barrel and screw assembly of claim 2, wherein the screw portion extends rearward from the rear end of the barrel body.

14. A modular barrel and screw assembly for use in injection molding comprising:
a barrel having a barrel body, a separate barrel injection portion and a separate barrel end cap, with the barrel end cap configured to be removably connected to the barrel injection portion and the barrel injection portion configured to be removably connected to the barrel body, and a screw assembly having a screw portion and a screw tip assembly configured to be removably connected to the screw portion and movable within the barrel injection portion and barrel end cap;
an annular seal having a passage sized at a rear end to match an inner diameter at a front end of a passage through the barrel body and sized at a front end to match an inner diameter at a rear end of a passage through the barrel injection portion;
wherein an injection chamber having a shot volume is defined by the barrel injection portion, the barrel end cap and the screw tip assembly; and
further comprising a second separate barrel injection portion and a second separate barrel end cap, with the second barrel end cap configured to be removably connected to the second barrel injection portion and the second barrel injection portion configured to be removably connected to the barrel body, and a second screw tip assembly configured to be removably connected to the screw portion and movable within the second barrel injection portion and second barrel end cap;
a second annular seal having a passage sized at a rear end to match the inner diameter at the front end of the passage through the barrel body and sized at a front end to match an inner diameter at a rear end of a passage through the second barrel injection portion, which is larger than the inner diameter at the rear end of the passage through the first barrel injection portion;
the second barrel injection portion configured to be removably connected to the barrel body when the screw tip assembly has been removed from the screw portion and the barrel injection portion has been removed from the barrel body; and
wherein a second injection chamber having a second shot volume is defined by the second barrel injection portion, the second barrel end cap and the second screw tip assembly, and the second shot volume is larger than the shot volume defined by the barrel injection portion, the barrel end cap and the screw tip assembly.

15. The modular barrel and screw assembly of claim 14, wherein:
the screw portion extends within the passage of the barrel body and rearward from the rear end of the barrel body;
the barrel end cap having a passage extending from a rear end to a front end, with the passage including a forward extending nozzle portion and the passage having a rearward facing recess extending between the rear end and the nozzle portion thereof;
the screw tip assembly being sized to be received within the passage of the barrel injection portion and having a front end sized and shaped to be received by the rearward facing recess in the barrel end cap when removably connected to a front end of the screw portion and when the screw tip assembly is in a forwardmost position;
the inner diameter at the rear end of the second barrel injection portion being of sufficient size to receive a front end of the screw portion, and the rear end of the second barrel injection portion configured to be removably connected to the front end of the barrel body;

the second barrel end cap having a passage extending from a rear end to a front end, with the passage including a forward extending nozzle portion and having a rearward facing recess extending between the rear end and the nozzle portion thereof, with an inner diameter at the rear of the rearward facing recess sized to match the inner diameter of the passage at the front end of the second barrel injection portion;

the second screw tip assembly being sized to be received within the passage of the second barrel injection portion and having a front end sized and shaped to be received by the rearward facing recess in the second barrel end cap when removably connected to a front end of the screw portion and when the second screw tip assembly is in a forwardmost position.

16. The modular barrel and screw assembly of claim 14, further comprising a third separate barrel injection portion and a third separate barrel end cap, with the third barrel end cap configured to be removably connected to the third barrel injection portion and the third barrel injection portion configured to be removably connected to the barrel body, and a third screw tip assembly configured to be removably connected to the screw portion and movable within the third barrel injection portion and third barrel end cap;

a third annular seal having a passage sized at a rear end to match the inner diameter at the front end of the passage through the barrel body and sized at a front end to match an inner diameter at a rear end of a passage through the third barrel injection portion, which is larger than the inner diameter at the rear end of the passage through the second barrel injection portion;

the third barrel injection portion configured to be removably connected to the barrel body when the screw tip assembly and second screw tip assembly have been removed from the screw portion and the barrel injection portion and second barrel injection portion have been removed from the barrel body; and wherein a third injection chamber having a third shot volume is defined by the third barrel injection portion, the third barrel end cap and the third screw tip assembly, and the third shot volume is larger than the shot volume defined by the barrel injection portion, the barrel end cap and the screw tip assembly, as well as the second shot volume defined by the second barrel injection portion, the second barrel end cap and the second screw tip assembly.

17. The modular barrel and screw assembly of claim 16, wherein:

the screw portion extends within the passage of the barrel body and rearward from the rear end of the barrel body;

the barrel end cap having a passage extending from a rear end to a front end, with the passage including a forward extending nozzle portion and the passage having a rearward facing recess extending between the rear end thereof and the nozzle portion;

the screw tip assembly being sized to be received within the passage of the barrel injection portion and having a front end sized and shaped to be received by the rearward facing recess in the barrel end cap when removably connected to a front end of the screw portion and when the screw tip assembly is in a forwardmost position;

the inner diameter at the rear end of the third barrel injection portion being of sufficient size to receive a front end of the screw portion, and the rear end of the third barrel injection portion configured to be removably connected to the front end of the barrel body;

the third barrel end cap having a passage extending from a rear end to a front end, with an opening at the rear end of the passage sized to match the inner diameter of the passage at the front end of the third barrel injection portion, the passage including a forward extending nozzle portion and the passage having a rearward facing recess extending between the rear end and the nozzle portion thereof;

the third screw tip assembly being sized to be received within the passage of the third barrel injection portion and having a front end sized and shaped to be received by the rearward facing recess in the third barrel end cap when removably connected to a front end of the screw portion and when the third screw tip assembly is in a forwardmost position.

* * * * *